Patented June 23, 1953

2,643,253

UNITED STATES PATENT OFFICE 2,643,253

DI-QUATERNARY SALTS OF 4-AMINO-6-(2'-AMINO PYRIMIDYL-4'-AMINO) QUINAZOLINE AND PROCESS OF PREPARING SAME

Francis Henry Swinden Curd, deceased, late of Blackley, Manchester, England, by Muriel Ruth Curd, executrix, Bramhall, England, and Edwin H. P. Young, Blackley, Manchester, England, assignors to Imperial Chemical Industries Limited, a corporation of Great Britain No Drawing. Application December 3, 1951, Serial No. 259,708. In Great Britain December 6, 1950

5 Claims. (Cl. 260—256.4)

This invention relates to new quinazoline derivatives and more particularly it relates to new di-quaternary salts of a pyrimidylaminoquinazoline which possess valuable trypanocidal properties and to processes for making them.

The said new quinazoline derivatives are di-quaternary salts of 4-amino-6-(2'-aminopyrimidyl-4'-amino) quinazoline.

We have found that the said new di-quaternary salts possess the property of powerful trypanocidal activity as tested in mice against Trypanosoma species.

It will be understood that although the new compounds in question are described herein as di-quaternary salts of a pyrimidylaminoquinazoline, they can also be formulated and named as salts of mono-quaternary salts of a dihydropyrimidylaminoquinazoline or of a pyrimidylaminodihydroquinazoline or again as di-salts of a dihydropyrimidylaminodihydroquinazoline.

According to a further feature of the invention there is provided a process for the manufacture of the said new substances which comprises reacting 4-amino-6-(2'-aminopyrimidyl-4'-amino)quinazoline or a mono-quaternary salt thereof with a quaternary salt-forming agent.

It will be understood that in reacting this substance with a quaternary salt-forming agent the reaction may take place in a single stage or in two stages. That is to say one may obtain as an intermediate product one or both of the mono-quaternary salts and it may be necessary to isolate the desired di-quaternary salt from a mixture of products.

As suitable quaternary salt-forming agents there are for example methyl iodide, dimethyl sulphate and methyl p-toluene sulphonate.

The reaction is carried out by heating the reactants together, conveniently in a solvent which may be for example ethyl alcohol, acetonitrile or nitrobenzene. Where the tendency for the formation or intermediate products is marked the process may advisably be carried out in a solvent of high boiling point such as nitrobenzene or, alternatively, if the solvent is of low boiling point, in a closed vessel under pressure. Where the quaternary salt-forming agent is a dialkyl sulphate it is convenient to use a dry non-hydroxylic solvent and dry nitrobenzene has been found to be particularly suitable for this purpose.

It is frequently convenient in isolation of the product to convert the quaternary salt to the salt of a different anion. Thus the dimethochloride may often conveniently be made by using as quaternary salt-forming agent dimethyl sulphate and then converting the resultant di-(methomethyl sulphate) into the dimethochloride by the action of e. g. sodium chloride.

The invention is illustrated but not limited by the following examples in which the parts are by weight:

Example 1

2 parts of 4-amino-6(2'-aminopyrimidyl-4'-amino)quinazoline 1-methiodide, 10 parts of methyl p-toluenesulphonate and 24 parts of dry nitrobenzene are stirred together and the stirred mixture is heated at 110–120° C. for 24 hours. It is then cooled and filtered. The solid is washed with 100 parts of benzene and then with 100 parts of petroleum ether (B. P. 40–60 C.) and is then dried at 60° C. It is then crystallised from methanol and 4-amino-6-(2'-aminopyrimidyl-4'-amino)quinazoline 1:1'-di(metho-p-toluenesulphonate) is obtained as pale yellow crystals, M. P. 336–338° C. (decomp.).

The starting material used in the process of the above example may be obtained as follows:

6.04 parts of 4:6-diaminoquinazoline 1-methiodide, 2.59 parts of 4-chloro-2-aminopyrimidine, 1 part of concentrated hydrochloric acid and 100 parts of water are boiled together under reflux for 1 hour. The mixture is then made alkaline to Brilliant Yellow by addition of sodium carbonate and 100 parts of sodium iodide are then added. The mixture is then filtered and the solid is washed with 75 parts of ethanol and then with 200 parts of acetone and is then dried. 4-amino-6-(2'-aminopyrimidyl-4'-amino)quinazoline 1-methiodide is obtained and may be crystallised from water to give yellow crystals M. P. 278–280° C. (decomp.).

Example 2

2.53 parts of 2-amino-4-(4-amino-6-quinazolylamino)pyrimidine, 5 parts of methyl p-toluenesulphonate and 35 parts of dry nitrobenzene are stirred and heated at 200–210° C. for 30 minutes. The mixture is then cooled and filtered and the residual solid is washed with acetone and dried. It is then dissolved in 250 parts of hot water, the solution is neutralised by addition of sodium bicarbonate and is then treated with 50 parts of sodium chloride. It is then filtered and the solid is washed with acetone and dried. By repeated treatment with sodium chloride and crystallisation from water there is obtained 4-amino-6-(2'-aminopyrimidyl-4'-amino)quinazoline 1:1'-dimethochloride as pale cream needles M. P. 348–350° C. (decomp.).

The starting material used in the process of the above example may be obtained as follows:

4 parts of 4:6-diaminoquinazoline, 3.27 parts of 2-amino-4-chloropyrimidine, 1.68 parts of concentrated hydrochloric acid and 50 parts of water are boiled together under reflux for 1 hour. The solution is cooled and adjusted to pH 10 by the addition of sodium hydroxide solution. It is then filtered and the solid is washed with water and dried. This solid is crystallised from aqueous ethanol and 2-amino-4-(4-amino-6-quinazolylamino)-pyrimidine is obtained as colourless needles M. P. 308° C. (decomp.).

What we claim is:

1. Di-quaternary salts of 4-amino-6-(2'-amino-pyrimidyl-4'-amino)quinazoline.
2. 4-amino-6-(2'-aminopyrimidyl-4' - amino)-quinazoline 1,1'-di(metho-p-toluenesulphonate).
3. 4-amino-6-(2'-aminopyrimidyl-4' - amino)-quinazoline 1,1'-dimethochloride.
4. Process as claimed in claim 5 wherein the quaternary salt-forming agent is methyl p-toluene sulphonate.
5. Process for the manufacture of di-quaternary salts of 4-amino-6-(2'-aminopyrimidyl-4'-amino)quinazoline which comprises reacting a member of the group consisting of 4-amino-6-(2'-aminopyrimidyl-4'-amino)quinazoline and mono-quaternary salts thereof with a quaternary salt-forming agent.

MURIEL RUTH CURD,
*Sole executrix of the estate of Francis Henry Swinden Curd, deceased.*
EDWIN H. P. YOUNG.

No references cited.